B. K. MALTBY.
Spectacles.
No. 79,847. Patented July 14, 1868.
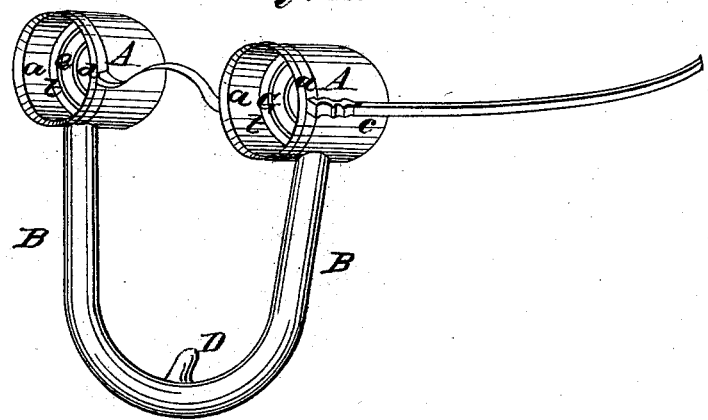
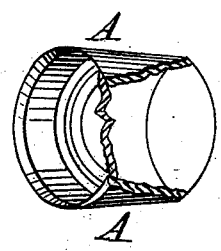
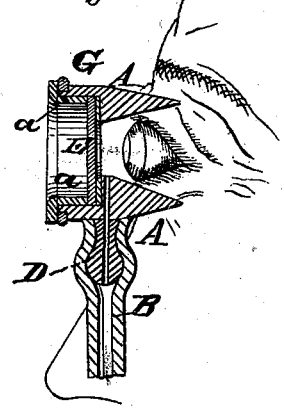
Witnesses:
D. E. Castle.
Thos. R. Young.
Inventor:
Benj. K. Maltby.

United States Patent Office.

BENJAMIN K. MALTBY, OF CINCINNATI, OHIO, ASSIGNOR TO CHARLES R. FOSDICK, OF SAME PLACE.

Letters Patent No. 79,847, dated July 14, 1868.

IMPROVEMENT IN EYE-CUPS.

The Schedule referred to in these Letters Patent and making part of the same.

TO ALL WHOM IT MAY CONCERN:

Be it known that I, BENJAMIN K. MALTBY, of Cincinnati, in the county of Hamilton, and State of Ohio, have invented a new and useful Improvement in Spectacles; and I do hereby declare that the following is a full, clear, and exact description of the construction and operation thereof, reference being had to the annexed drawings, and the letters marked thereon, making a part of this application, in which—

Figure 1 is a perspective view, and

Figures 2 and 3 vertical sections.

The instrument entire, as seen in fig. 1, is a combination of eye-tubes with the ordinary spectacles, the glasses, however, usually without magnifying power, being used more properly to aid in making exhausted receivers of the eye-tubes, closing the outer ends, yet permitting the ordinary action of the eyes in reading, &c., by their transparency.

The letters A A mark the eye-tubes, and $a$ $a$ the inner tubes or rings, fitted, by a thread upon the outer surface, to screw into the ends of the tubes A A, opposite the eyes, and upon the spectacle-frame C, and pressing upon the glasses E E and the elastic rings or packing, G G, under them, making the tube ends, opposite the eyes, air-tight.

B is an elastic tube, with a mouth-piece, D, through which the air can be exhausted from the space in front of the eyes, drawing them inward, and by the conical shape of the apertures they are slightly compressed in circumference, and consequently in proportion elongated, the object being to prevent and correct the flattening of the eye, and bring the image properly upon the retina, which, in long-sightedness, is formed back of it.

Figs. 2 and 3 both represent the eye as acted upon by the tubes, but fig. 3 more properly shows the interior structure of the tubes. In this, A A shows the inner shape of the tube: first, the conical shape of the opening for the eye, then the shoulder on which the ring or packing G and the glass E rest, and $a$ $a$, the inner tube screwed upon them. The small tube $d$, on which the elastic curved tube B fastens, communicates, by a small aperture, with the space between the eye and the glass, and permits the exhaustion of the air around the eye by suction.

This combination of eye-tubes with spectacles is claimed as a remedy for the great defect in all instruments heretofore invented for the above purpose. The eye, instead of being inactive and kept in darkness while the compression by exhausting the air around it is going on, is called into healthful exercise, and the restoring process is aided by the efforts of the eye itself.

I disclaim the invention of eye-tubes, considered separately; but

What I claim as my invention, and desire to secure by Letters Patent, is—

The use of tubes that serve as receivers for exhausting the air around the eye, in combination with spectacles, with or without magnifying power, designed to elongate the eye, and by proper use to prevent and also to cure long-sightedness.

BENJ. K. MALTBY.

Witnesses:
M. DEISINGER,
E. MALTBY.